United States Patent [19]

Nozaki et al.

[11] 3,868,101
[45] Feb. 25, 1975

[54] WELDING POSITIONER
[75] Inventors: Terumichi Nozaki; Hideo Kobayashi; Sigeyuki Ohno; Yu Imaoka, all of Okayama, Japan
[73] Assignee: Mitsui Shipbuilding & Engineering Co., Ltd., Chuoku, Tokyo, Japan
[22] Filed: Aug. 8, 1973
[21] Appl. No.: 386,581

[30] Foreign Application Priority Data
Aug. 10, 1972 Japan.............................. 47-80569

[52] U.S. Cl................ 269/25, 269/61, 269/139, 269/156, 269/287, 269/321 H
[51] Int. Cl....... B23k 37/04, B25b 1/20, B25b 1/22
[58] Field of Search.............................. 269/55–61, 269/88, 104–108, 139, 152, 156, 164, 258, 287, 321 H; 279/110; 214/1 QF, 1 QG; 228/44, 47

[56] References Cited
UNITED STATES PATENTS

| 1,440,888 | 1/1923 | O'Donnell | 214/46.32 |
| 2,523,880 | 9/1950 | Schoenfielder | 214/1 QG |
| 3,430,970 | 3/1969 | Gannon, Jr. | 269/139 X |
| 3,521,875 | 7/1970 | Kapelsohn | 269/287 X |

*Primary Examiner*—Roy Lake
*Assistant Examiner*—Neil Abrams
*Attorney, Agent, or Firm*—Howson and Howson

[57] ABSTRACT

Positioner for welding the tack welded hull module or block whereby the module or block may be made by welding comprising a cage comprising rotatably mounted rings and clamping means for the module or block, said clamping means being movably provided along the inner ring, whereby modules or blocks of various shapes may be clamped.

3 Claims, 9 Drawing Figures

WELDING POSITIONER

The present invention relates to a welding positioner, and particularly to a positioner for welding the seams of the large hull module or block in shipbuilding.

An object of the present invention is to provide a positioner which may be utilized in welding blocks of various shapes.

Another object of the present invention is to provide a positioner which eliminates the necessity for cranes in introducing the module or block into the positioner.

A further object of the present invention is to provide a positioner which is rotatable about its central axis, so that the seams of the module or block may be made by welding.

Other objects and advantages will be set forth more fully in the following description of the embodiment of the invention illustrated in the accompanying drawings.

Figure 1:
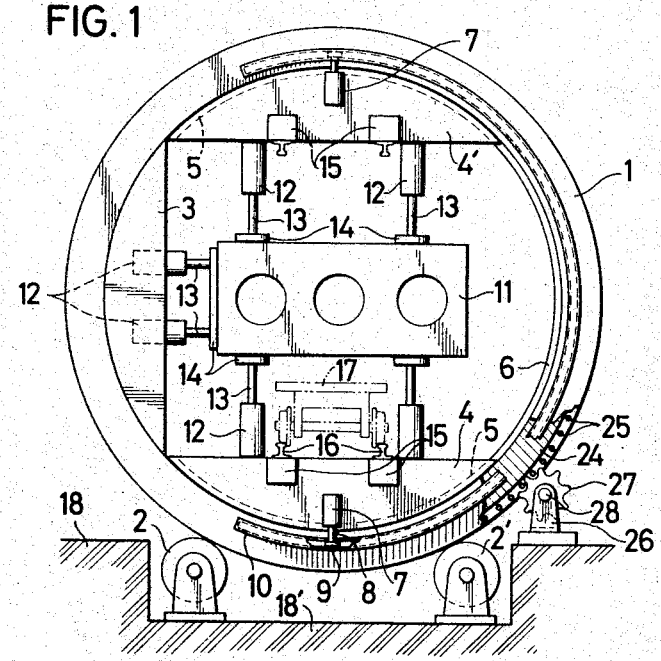
FIG. 1 is an end view illustrating the positioner according to the present invention as employed in welding the rectangular block.
Figure 2:
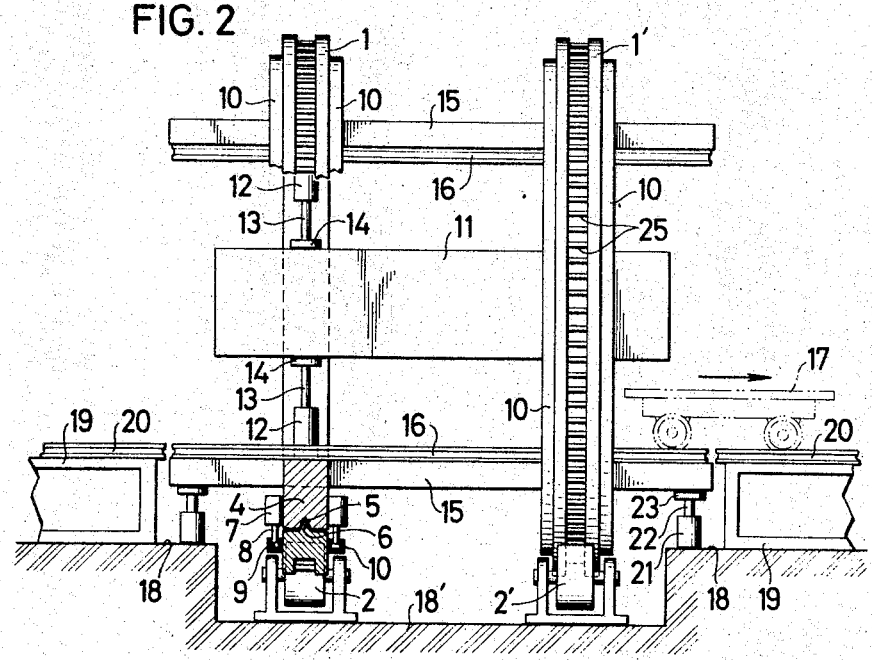
FIG. 2 is a side view of the positioner.

Referring to FIGS. 1 and 2, a pair of rings 1 and 1' are rotatably supported by rollers 2 and 2' provided in the recess 18' of the base 18. On the inner side of each ring, a stationary supporting bed 3 and two movable supporting beds 4 and 4' are provided. Each movable supporting bed has a peripheral groove 5 which slidably engages with the guide rib 6 provided on the inner side of the ring. On both sides of the movable supporting bed, a pair of oil hydraulic cylinders 7 are provided, and a slider 9 provided at the top of the piston rod 8 of each oil hydraulic cylinder 7 is engaged with guide rail 10 having a U-shaped section. On each bed, a pair of oil hydraulic cylinders 12 are provided for clamping of the rectangular block to be welded, each piston rod 13 having a support plate 14. Corresponding movable supporting beds 4, 4 and 4', 4' of both rings 1 and 1' are connected by parallel girders 15 to be constructed into a cage. Rail 16 is mounted on each girder 15 for moving of the carriage 17. A pair of rails 16 are adapted to be connected with rails 20 on frames 19 on the base 18, when the rails are positioned in the horizontal plane as shown in FIGS. 1 and 2. Further, the device is so arranged that supporting plates 23 of piston rods 22 of oil hydraulic cylinders 21 provided on the base 18 may be engaged with the under sides of the girders 15 at both ends thereof. A plurality of pins 25 provided in the groove 24 of the periphery of each ring forms a pin rack. The pin rack is engaged with the pinion 27 carried by the support 26, the shaft 28 of the pinion being connected to the motor via a reduction mechanism.

Figure 3A:
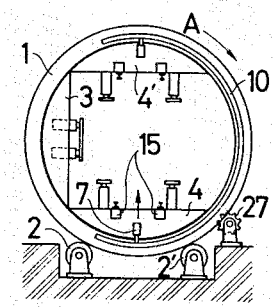
FIG. 3a to FIG. 3e are end views illustrating operation of the positioner in introducing the triangular block.
Figure 3B:
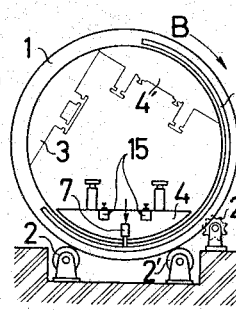
Figure 3C:
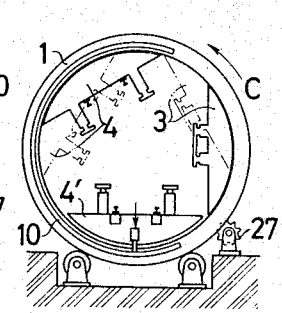
Figure 3D:
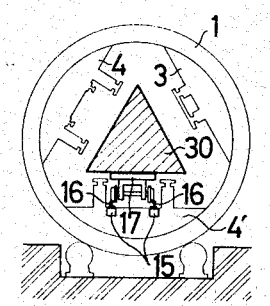

The operation of the positioner in welding the triangular block, by way of example, will be described later herein. Referring to FIG. 3a, the oil hydraulic cylinder 7 of the lower movable bed 4 is set in idle state, and the movable bed is lifted by the oil hydraulic cylinder 21. Then, the cage comprising rings 1 and 1' is rotated 302 in the direction of arrow A by rotating pinions 27, to where the stationary beds 3 are at 60° with the movable beds 4 as shown in FIG. 3b. Thereafter, each movable bed 4 is lowered by operation of the cylinder 21 to engage with the ring by engaging groove 5 and rib 6, and clamped with the ring by actuation of the cylinder 7. Further, rings 1 and 1' are rotated in the direction of the arrow B to position the movable beds 4' horizontal, and the cylinders 7 of the movable beds are set in idle state and the bed lifted by cylinder 21. Then rings are rotated 30° in the direction of arrow C of FIG. 3c to where the beds 3, 4 and 4' are at 60° to each other. Each movable bed 4' is then lowered and secured to the ring as above described manner. Thus, equilateral triangular space is formed in the cage as shown in FIG. 3d.

Figure 3E:
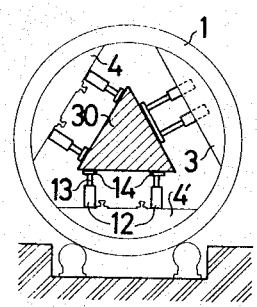

The tack welded block 30 having equilateral section is introduced in the cage by the carriage 17 and lifted by supporting plate 14 of each piston rod 13 of the movable bed 4' and then cramped by supporting plates 14 of other piston rods 13 of beds 3 and 4 as shown in FIG. 3e. The carriage 17 is retracted from the cage. Thus, the cage may be rotated together with the block to permit the welding of the seams of the block 30. To remove the block, the cage is rotated to such a position that one of the movable beds 4 and 4' is positioned horizontal and the carriage 17 is introduced on the rail 16 of the horizontal movable bed. Thereafter the piston rod of each cylinder 12 is retracted to put the block on the carriage and the carriage is removed from the cage.

Figure 4:
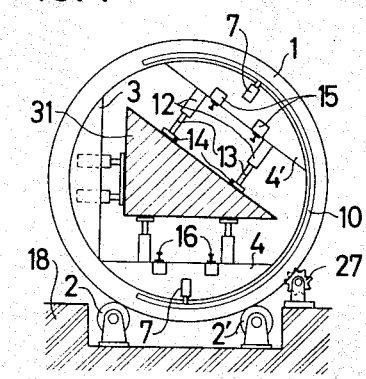
FIG. 4 and FIG. 5 are end views illustrating the positioner as employed in welding other types of blocks.
Figure 5:
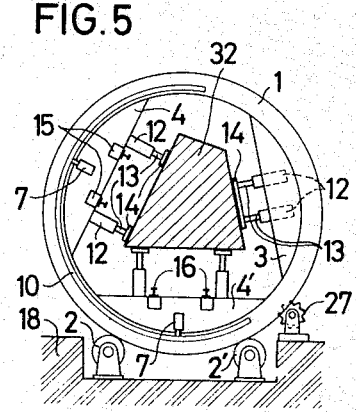

Referring to FIGS. 4 and 5, other types of blocks 31 and 32 as shown in the figures are also cramped in the cage in the similar manner to the above described manner and welding may be performed.

What is claimed is:

1. A welding positioner for clamping an object to be welded, comprising:

a pair of rings, and rollers mounting said rings for rotation;

a stationary supporting bed secured to each ring;

movable supporting beds in each of said rings hydraulic cylinder means provided on each movable supporting bed engageable with said ring to secure said each movable supporting bed to said ring;

additional hydraulic cylinder means provided on each supporting bed for clamping the object to be welded;

rails mounted on each movable supporting beds in said two rings, and adapted to receive a carriage carrying said object and to transfer said carriage to and from other rails positioned adjacent said rings;

lifting means adjacent said rings adapted to engage said bed-supported rails for removing said movable supporting beds from contact with said rings; and means for rotating said rings.

2. Apparatus for receiving an object of the approximate size of a ship module or block from a carriage on rails adjacent said apparatus, for clamping said received object, for turning said clamped object to facilitate performance of work thereon, and for then returning said object to a position on said carriage on said adjacent rails, comprising:

a pair of substantially vertically oriented rings;

means mounting said rings rotatably in axially spaced-apart coaxial relation, with the centers thereof clear to receive said object;

motor means for rotating said rings to desired angular positions;

a plurality of beds in each of said rings, at least two of said beds in each said ring being circumferentially movable relative to their corresponding ring, each of said beds having remotely actuatable clamping means for clamping and unclamping said object;

at least one set of rails secured to one rail-supporting bed in one of said rings and to another corresponding rail-supporting bed in the other of said rings, said at least one set of rails being alignable with said adjacent rails by appropriate circumferential motion of said rail-supporting beds;

controllable holding means adjacent said rings controllable either to hold fixed any selected one of said movable beds while its corresponding ring rotates thereby to effect said relative circumferential motion, or to cause said selected bed to rotate circumferentially with said corresponding ring; and remotely controllable means operable: to control said motor means and said holding means for orienting said beds to the positions desired for receiving and later clamping said object and for aligning one of said sets of rails with said adjacent rails so that said carriage carrying said object can be moved onto said one set of rails and within both of said rings; to control said clamping means for clamping said received object; to control said holding means for causing each of said beds to rotate with its corresponding ring; to control said motor means for rotating said rings and said clamped object after said carriage is withdrawn to said adjacent rails, to facilitate work on said object; to control said motor means to align one of said at least one set of rails with said adjacent rails to permit return of said carriage to within said rings; and to control said clamping means for unclamping said object and returning it to said carriage for withdrawal to said adjacent rails.

3. Apparatus in accordance with claim 2, in which:

said beds comprise one bed in each of said rings which is fixed with respect to its corresponding ring and two beds which are movable;

said at least one set of rails comprises two sets of rails each joining a different corresponding pair of said movable beds in said two rings;

said motor means comprises a motor and a peripheral drive for at least one of said rings;

said holding means comprise hydraulic-cylinder lifting means for lifting the lowermost one of said beds in each of said rings with respect to its corresponding ring, to permit rotation of said last-named ring with respect to said lowermost bed, and hydraulic-cylinder locking means for locking any selected beds to their corresponding rings to rotate therewith;

said clamping means comprises hydraulic cylinder means positioned to lift said object from said carriage during clamping, and to lower it to said carriage during unclamping.

* * * * *